United States Patent [19]

Billington

[11] 4,278,183
[45] Jul. 14, 1981

[54] DISPENSING APPARATUS AND METHOD

[75] Inventor: William P. Billington, Flitwick, England

[73] Assignee: National Research Development Corporation, London, England

[21] Appl. No.: 31,136

[22] Filed: Apr. 18, 1979

[30] Foreign Application Priority Data

May 4, 1978 [GB] United Kingdom ............. 17684/78

[51] Int. Cl.³ ..................... A01C 19/00; B65G 47/36
[52] U.S. Cl. .................................... 221/211; 111/77; 198/689
[58] Field of Search ..................... 221/211, 278, 96; 111/77; 198/486, 689; 209/905, 906, 158; 294/64 A, 64 R, 98, 195; 271/98

[56] References Cited

U.S. PATENT DOCUMENTS

| | | | |
|---|---|---|---|
| 2,812,061 | 11/1957 | Pfister | 271/98 X |
| 3,240,175 | 3/1966 | Clow | 111/77 |
| 3,312,341 | 4/1967 | Weinceke et al. | 209/158X |
| 3,406,869 | 10/1968 | Cordova | 221/211 |
| 3,638,393 | 2/1972 | Datta | 221/211 |
| 3,698,332 | 10/1972 | McCallun | 221/211 |
| 3,700,102 | 10/1972 | Higgins | 209/158 |
| 4,119,242 | 10/1978 | Jesty | 221/211 |

FOREIGN PATENT DOCUMENTS 7611156 4/1977 Netherlands ............... 221/211

Primary Examiner—Allen N. Knowles
Attorney, Agent, or Firm—Cushman, Darby & Cushman

[57] ABSTRACT

In a seeder for singulating wet seeds, a seed capture nozzle dips into a reservoir of seeds suspended in water, and captures a seed on the nozzle by means of suction applied to a suction tube. The nozzle then moves from the seed reservoir to a release location, and releases the seed by application of a pulse of water to a pressure tube. The suction tube and pressure tube meet at a junction in a conduit in the movable capture head. The suction is applied continuously to the pressure tube, and release of the seed is achieved by applying at the pressure tube a pulse of water under pressure sufficient to overcome the applied suction. In a preferred form a seed reservoir may include an inlet bore in the base of a well for supplying an upwardly directed jet of water in the seed suspension for carrying a stream of seeds upwardly toward the surface of the water. This produces a fountain of seeds at the surface and the nozzle captures a seed from a concentration of seeds at the tip of the fountain.

7 Claims, 6 Drawing Figures

DISPENSING APPARATUS AND METHOD

The present invention relates to apparatus and a method for dispensing discrete objects, and is concerned in particular but not exclusively with apparatus and method for dispensing seeds individually from a suspension of seeds in water or aqueous solutions.

Some seed drills in common use are capable of dispensing seeds in the dry state individually for sowing at regular intervals, but the reliability of sowing one seed and one seed only at each interval is not high in practical conditions. It is also known that there are advantages in sowing seeds in a wet state, especially after they have been allowed to imbibe water for a specified time and to become partially chitted. The main advantage is that the seed can be partially or completely germinated under determined conditions before drilling either into the field or into soil blocks, with the result that the crop growth is quicker, more controlled, and with a greater reliability of a visible plant at each required position. However the reliability of dispensing one seed on each required occasion in the wet state is even less than with dry seed.

The need to ensure that a single viable seed is dispensed on each required occasion is particularly acute when dispensing seed into soil blocks. Because of the extra investment in compost and glasshouse conditions for blocked seeds, the loss is correspondingly great if some blocks do not contain viable seeds. The objective of producing a viable plant in each block is even more important where automatic transplating equipment is used for the blocks, again because of the increased investment in the operation.

In practice there are two major difficulties involved in achieving the objective of a viable plant at each growing station. Firstly the germination potential of seed is insufficiently high to permit the use of natural untreated seed in most circumstances, and secondly the seeds are often of a shape or size which presents problems to machines for metering them with conventional plate or belt seeders. Either difficulty may be overcome by broadcasting seed into trays of compost for subsequent pricking out, and the second difficulty can be overcome by using pellted seed. However both these solutions greatly add to the cost of planting the crop. Although in some circumstances a vacuum seeder can be used for awkward sized seeds, it is ideally required to have a single dispensing apparatus which, with small alterations of pick-up head, ca meter a wide range of species either dry or pregerminated. It has not been found that any of the presently available seed dispensing devices can meet the various requirements set out above.

It has been proposed previously for example to capture seeds on a plurality of probes or pick-up arms which move through a suspension of seeds in water, and each of which captures a seed at a capture orifice of the probe by virtue of a suction applied to the interior of the probe. As the probe is moved, with the seed, to a release region, the suction ceases to be applied to the interior of the probe and the seed is intended to be released. Most commonly the probes are arranged in the form of spokes of a rimless wheel, i.e. projecting radially outwardly, and there is provided at the hub of the wheel a valve arrangement which applies suction to be probe during the pick-up part of the cycle and which isolates the probes from the suction during the release part of the cycle. Such arrangements exhibit difficulties in reliability due to the relatively complex nature of the valve arrangement, and the close tolerances of construction required.

Another difficulty which arises with these known arrangements concerns the method of release of the seed. Often the mere removal of the vacuum is not sufficient to dislodge the seed and commonly there is applied to the seed a jet of air or liquid to assist or effect the release. The jet may be applied from inside the probe in the form of a positive pressure applied after the suction has been removed, or may be applied externally as a jet to "knock" the seed off the capture orifice. In the first case the valving required is even more complicated than for a simple release of suction, and in the second case very precise positioning of the release jet and the moving probe is required to obtain the required release. Examples of these forms of seeding devices are to be found inter alia in U.S. Patent Specification No. 3,638,393 (Dataa) and Dutch O.P.I. Patent Specification No. 76.11156 (NRDC).

In another known arrangement it has been proposed to capture a seed on a probe by means of suction and to release the seed by mechanical movement down the probe of a cleaner wire which extends through the capture orifice of the probe and mechanically dislodges the seed. Such a device is described in U.S. Patent Specification No. 3,240,175 (Clow). It will readily be appreciated that such an arrangement requires extremely precise construction of the complex operating parts and is likely to require very high standards of maintenance to avoid failure in field conditions.

Indeed it will be appreciated from the above description that previously known devices for dispensing wet seeds have been of such complex construction, and have required such close tolerances of pressure levels and physical positioning of moving elements, as to be regarded more as laboratory equipment than farming equipment for use in seeding soil blocks or in drilling in the field. The present invention is concerned with providing, at least in preferred embodiments, a simple and robust apparatus and method for dispensing discrete objects such as seeds either in the dry or wet state, and at rates of delivery higher than have been reliably available previously.

According to the present invention there is provided apparatus for dispensing discrete objects comprising a container for containing discrete objects, a capture element having a capture orifice for capturing an object against the capture orifice from the container by means of a pressure difference across the orifice, transfer means for producing relative movement between the capture orifice and the container and for positioning the capture orifice after capture of an object at a release location for dispensing the object, first control means for applying continuously during normal operation to a region of the capture element communicating with the capture orifice a pressure below ambient pressure, and second control means for applying to the said region of the capture element when the capture orifice is at the release location in pulse of pressure greater than ambient pressure and sufficient to release a captured object from the capture orifice.

In normal circumstances, the said ambient pressure will be atmospheric pressure, but it is to be appreciated that the invention is not limited to operation in an environment at atmospheric pressure, for example the apparatus may operate within an enclosed environment maintained with an ambient pressure above or below atmospheric pressure.

Although the apparatus (and method to be set out hereinafter) according to the invention may operate for capture of a number of discrete objects greater than one, the invention finds particular advantage in the capture and release of a single discrete object at a time. However in the next succeeding paragraphs, preferred features of the invention will be set out with reference to the invention in its most general aspect, that is to say for capture of a number of objects, the term "number" meaning one or more than one.

Furthermore, the invention finds particular advantage where the container is adapted for containing seeds constituting the said discrete objects, and the capture element is adapted for capturing and releasing a seed from the capture orifice. However in the next succeeding paragraphs, the preferred features of the invention will again be set out in general terms insofar as reference will be made to the capture and release of discrete objects rather than seeds.

The said first control means of the apparatus according to the invention may comprise a control port for connection to a suction means for applying the said pressure below ambient pressure, the said control port being arranged to be in communication with the capture orifice throughout normal operation. Conveniently the said control port may be in direct communication with the capture orifice, without means for interrupting this communication, but it is to be appreciated that there may be provided, if required, a switchable closure means between the port and the capture orifice, for example for isolating the control port from the capture orifice when the apparatus is not in use. However such a switchable closure means would not interrupt the communiction between the control port and the capture orifice throughout normal operation.

Also conveniently the second control means comprises a control port for connection to a source of fluid under pressure greater than ambient pressure, and valve means for controlling fluid flow through the control port for providing a pulse of fluid to the capture orifice to release a capture object from the capture orifice.

In a preferred arrangement, both the control ports mentioned above are provided, so that the first control means comprises a first control port for connection to a suction means for applying the said pressure below ambient pressure, the first control port being arranged to be in communication with the capture orifice throughout normal operation, and the second control means comprises a second control port for connection to a source of fluid under pressure greater than ambient pressure and valve means for controlling fluid flow through the second control port for providing a pulse of fluid at the capture orifice to release a captured object from the capture orifice.

Conveniently suction means and a source of fluid under pressure may be provided as part of the apparatus according to the invention, and in such an arrangement it is thus provided that the first control means comprises a suction means for producing a pressure below ambient pressure, the suction means being connected to be in communication with the capture orifice throughout normal operation of the dispensing apparatus, and the second control means comprises a source of fluid under pressure greater than ambient pressure and valve means connected between the source of fluid and the capture orifice for passing a pulse of fluid to the said region of the capture element communicating with the capture orifice to release a captured object. The suction means may comprise for example a vacuum pump, and the source of fluid may comprise for example an air or water pump or a pipe supplying water at mains pressure or at a pressure reduced from mains pressure. The said valve means may either be positioned between the second control port and the capture orifice, or, more preferably, between the second control port and the pressure source.

In preferred arrangements, the said region of the capture element communicating with the capture orifice comprises a conduit leading to the capture orifice. Most preferably the capture element comprises a tubular member having the capture orifice formed at one end thereof. However in other arrangements, the said region of the capture element communicating with the capture orifice may comprise for example a plenum chamber communicating with the capture orifice, or alternatively more than one conduit may be provided leading to the capture orifice, and combining together to form the said region at a position closely adjacent the capture orifice.

It is to be appreciated that the said relative movement between the capture orifice and the container may be carried out either by maintaining the container stationary relative to a main frame of the apparatus, and moving the capture element relative to the container and the main frame, or by maintaining the capture element stationary relative to a main frame of the apparatus and moving the container relative to the capture element and the main frame. Of these, the former is much preferred, and in particular it is preferred that the transfer means includes cyclical drive means for driving the capture element in a cycle of movement between a first position in which the capture orifice is positioned in the locality of the container for capture of an object, and a second position in which the capture orifice is positioned at said release location for dispensing an object.

There is also provided in accordance with the present invention in a preferred form, a particularly advantageous container for containing objects in suspension in a fluid for capture by a capture element. In previously known arrangements for capturing objects such as seeds from liquid, the objects have been distributed in a suspension in the liquid, and it has been an object of the apparatus to provide stirring means for maintaining the seeds in an even distribution in the container.

In accordance with a preferred feature of the present invention, the said container of the apparatus according to the invention comprises a container for containing discrete objects in suspension in a fluid, and preferably has flow means for supplying an upwardly directed flow of fluid in the suspension of objects in the container for carrying a stream of discrete objects upwardly towards the surface of the suspension of objects for capture by the orifice. Preferably there is provided mounting means for mounting said capture element for downward movement towards said upward stream of objects in the container for capture of an object by the capture orifice, preferably the capture element being arranged to dip the said capture orifice downwardly in a substantially vertical movement into the container to capture a discrete object.

Conveniently the flow means comprises an inlet passageway in the base of the container for directing a flow of fluid under pressure greater than the pressure of the fluid in the container upwardly into the suspension of objects in the container. Preferably the inlet passageway is positioned centrally at the base of the container. Also preferably the cross-section of the interior of the container increases in a vertical direction with distance from the base of the container, most preferably the vertical cross-section of the container being generally in the form of part, preferably half, an allipse with the major axis of the ellipse vertical. Also most preferably the interior of the container is uniformly symmetrical about its vertical axis.

Conveniently there may be provided a drain passageway from the container and a filter means in the container to allow liquid to be drained from the container without loss of the discrete objects from the container. Conveniently liquid may be drained from the container by allowing liquid to overflow over an upper rim of the container, and the liquid to be caught in a surrounding trough forming part of the container, the drain passageway leading from the surrounding trough. Conveniently liquid supply means to the inlet passageway may comprise a pump arranged to draw liquid from the said drain passageway and to return the liquid under pressure into the container to provide the said stream of discrete objects directed towards the surface.

There is also provided a method of dispensing discrete objects comprising the steps of capturing a number of discrete objects against a capture orifice by applying continuously to a region communicating with the capture orifice a pressure below ambient pressure, producing relative movement between the capture orifice and a plurality of discrete objects from which the said number of objects has or have been captured and positioning the capture orifice with the captured object or objects at a release location for dispensing the object or objects, and releasing the capture object or objects from the capture orifice by applying to the said region communicating with the capture orifice a pulse of pressure greater than ambient pressure and sufficient to release the capture object or objects. Conveniently the last mentioned step comprises applying to the said region communicating with the capture orifice a pulse of pressure greater than ambient pressure and sufficient to bring the pressure in the said region to a pressure above ambient pressure to effect release of the capture object or objects.

In one preferred form of the method the step of capturing the said number of discrete objects against the capture orifice comprises applying continuously the said pressure below ambient pressure to a conduit leading to the capture orifice, and the said step of releasing the capture object or objects from the capture orifice comprises supplying to the said conduit a pulse of fluid at a pressure higher than ambient pressure.

Also in a preferred form of the method, the said step of producing relative movement comprises moving the capture orifice in a cycle of movement between a first position in which the capture orifice is positioned in the locality of the said plurality of discrete objects for capture of the said number of discrete objects, and a second position in which the capture orifice is positioned at the said release location for dispensing the capture object or objects.

The method of the invention may be used for dispensing dry objects for example in air or for dispensing objects in liquid for example water. The invention has particular advantage where the method includes the steps of placing the said plurality of discrete objects in suspension in a fluid, and capturing the said number of discrete objects against the capture orifice from the suspension of objects in fluid. In such a form, the method may include the step of supplying an upwardly directed flow of fluid in the suspension of objects for carrying a stream of discrete objects upwardly towards the surface of the suspension of objects for capture by the orifice. Preferably then the method includes the step of moving the capture orifice in a downward movement towards the said upward stream of objects for capture of an object or objects by the capture orifice. The method of the invention has particularly preferred application where the said capturing and releasing steps comprise capturing a number of seeds against the capture orifice from a plurality of seeds, and releasing the said number of captured seeds from the capture orifice at the release location.

Also the method has particular advantage where the said capturing and releasing steps comprise capturing against the capture orifice a single discrete object at a time, and releasing from the capture orifice at the release location a single object at a time.

Thus although it is possible for the capture orifice to capture more than a single object at a time, it is preferred that the capture orifice has a combination of aperture size relative to the objects to be dispensed, and pressure difference across it, such that in normal operation one object at a time is captured on the capture orifice.

It is an advantage of the apparatus and method of the invention in comparison with previously known arrangement, that it is not necessary to provide switching means for disconnecting an applied pressure below ambient pressure (suction) from the capture orifice in order to release an object captured at the capture orifice. The provision of a pressure pulse above ambient pressure, to effect release of a captured object by overcoming the effect of the continuously applied suction, gives the advantage of a much quicker restoration of the more simple and reliable mechanism and method of operation than suction at the orifice after release of the object. Where previously known devices have attempted to achieve the rates of delivery of preferred embodiments of the present invention, the previously known devices have proved unreliable by delivering less than the required number of seeds per cycle. For example in previously known devices required to dispense single seeds at each cycle, attempts at high speed operation have resulted in a significant proportion of cycles in which no seed has been dispensed.

The particularly advantageous form of container set out hereinbefore may be used in some circumstances in combination with capture elements other than those set out in preceding paragraphs in accordance with the invention in its main aspect. Thus there is provided in accordance with the present invention in a second aspect apparatus for dispensing discrete objects from a fluid comprising a container for containing discrete objects in suspension in a fluid, a capture element having a capture orifice for capturing an object against the capture orifice from the container for means of a pressure difference across the orifice, transfer means for producing relative movement between the capture orifice and the container and for positioning the capture orifice after capture of an object at a release region for dispensing the object, the release means for releasing the captured object from the capture orifice, the said container for containing discrete objects in a fluid having provided therein flow means for supplying an upwardly directed flow of fluid in the suspension of objects in the container for carrying a stream of discrete objects upwardly towards the surface of the suspension of objects for capture by the orifice. In this second aspect of the invention, the container may have any of the preferred features set out above in regard to the container when provided in the first main aspect of the invention. In this second aspect of the invention, the release means may comprise any convenient means for releasing the discrete object from the capture orifice, and may for example comprise a mechanical device for dislodging a capture object from the orifice, and/or an externally applied jet of liquid or air directed to dislodge the object from the orifice, and/or the mere removal from the capture orifice of the pressure difference by which the object is captured.

Also in accordance with the second aspect of the present invention, there may be provided a method of dispensing discrete objects from a fluid comprising the steps of placing discrete objects in suspension in a fluid, capturing a discrete object against a capture orifice by means of a pressure difference across the orifice, producing relative movement between the capture orifice and the said objects and positioning the capture orifice after capture of an object at a release region for dispensing the object, and releasing the captured object from the capture orifice, the first mentioned step including the step of supplying an upwardly directed flow of fluid in the said suspension of the said discrete objects such as to carry a stream of discrete objects upwardly towards the surface of the suspension for capture by the capture orifice. The features which have been set out above as features of the method according to the first main aspect of the present invention may also form the basis in general of features of the method according to the second aspect of the invention.

Where reference has been made to a fluid, the fluid may be a liquid (e.g. water) or a gas (e.g. air). In the various apparatus arrangements of the invention, conveniently at least one component is adapted to operate with or by means of a fluid constituted by a liquid, and in the various methods conveniently at least one of the fluids referred to is a liquid.

Embodiments of the invention will now be described by way of example with reference to the accompanying drawings in which.

Figure 1:
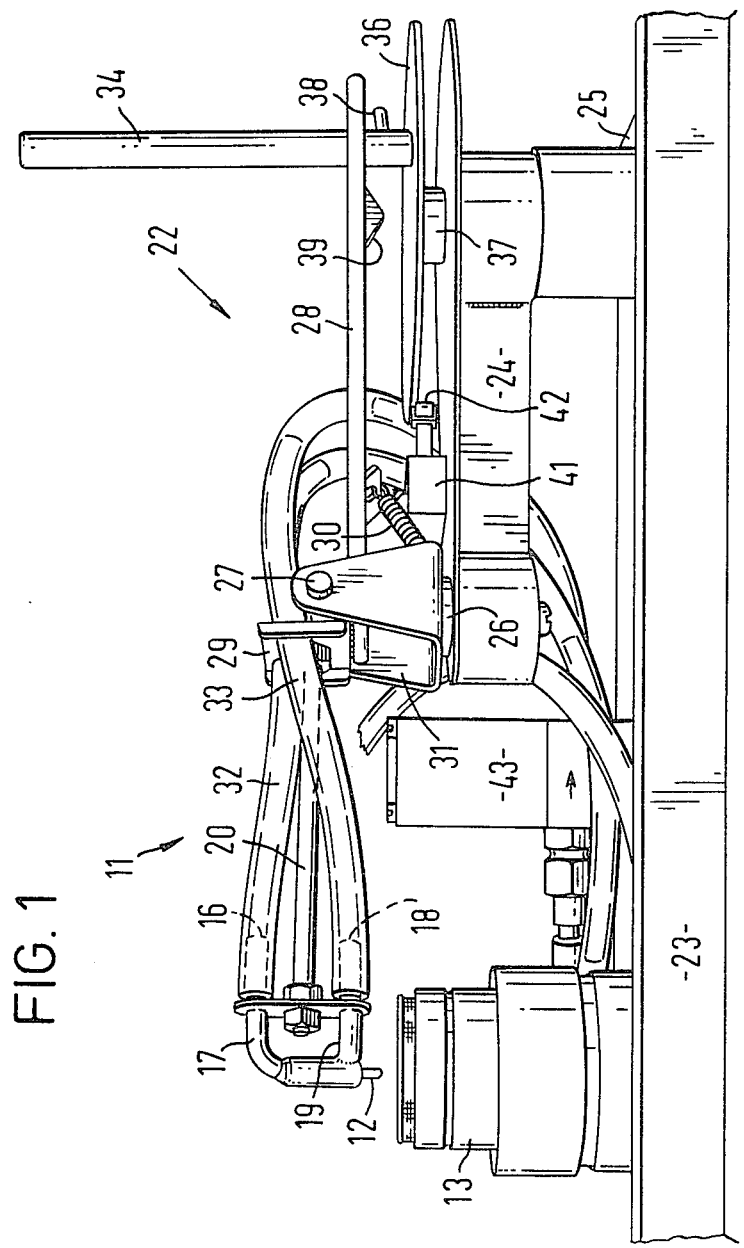
FIG. 1 is a perspective view taken from the side of an apparatus for dispensing seeds from water embodying the invention.
Figure 1A:
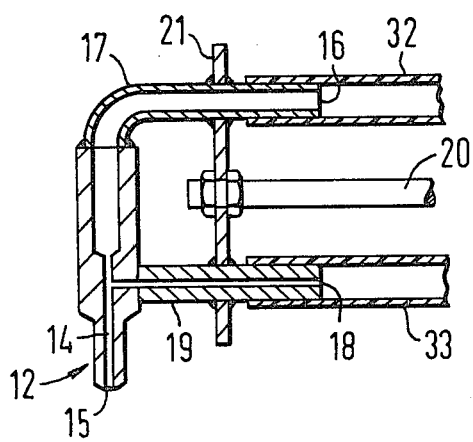
FIG. 1(a) shows a detail of FIG. 1.
Figure 2:
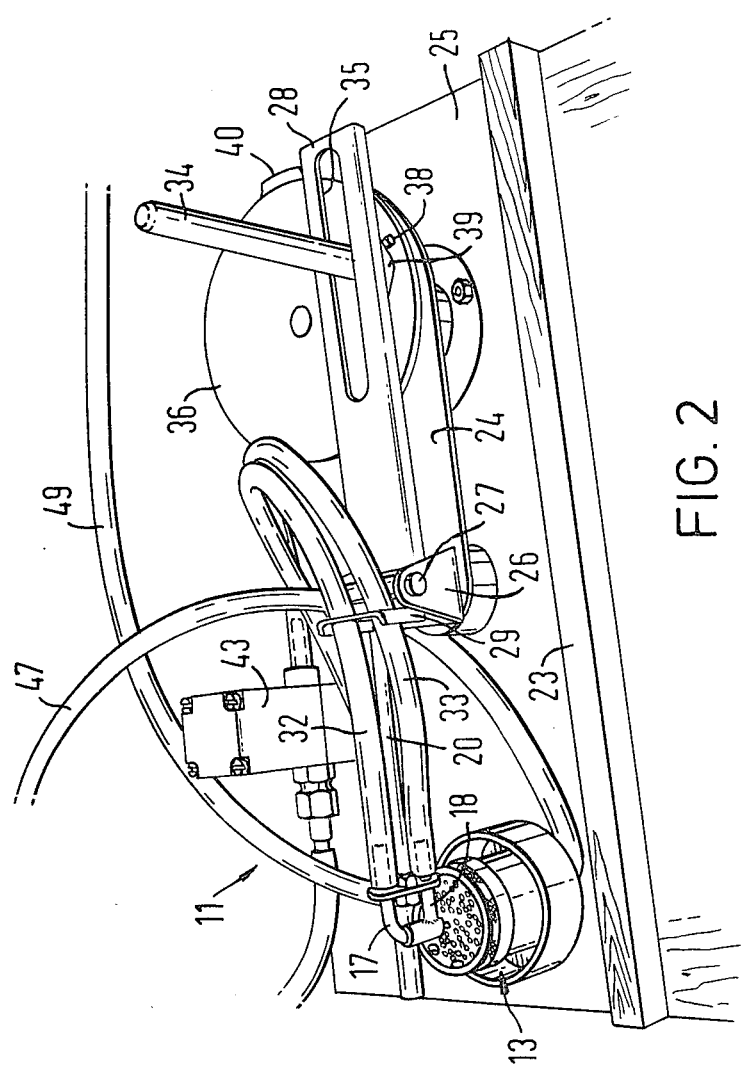
FIG. 2 is a perspective view of the apparatus shown in FIG. 1 but taken partly from above.

Referring firstly to FIGS. 1 and 2, apparatus embodying the invention for dispensing seeds is indicated generally at 11 and comprises a seed capture element 12 for capturing seeds from a seed container 13. As shown in the detailed drawing of FIG. 1a, the capture element 12 defines an internal conduit 14 leading to a capture orifice 15 for capturing a seed against the capture orifice by means of a pressure difference across the capture orifice. Communicating wth the internal conduit 14 are a first control port 16 at the end of a control tube 17, and a second control port 18 at the end of a second control tube 19, the control tubes 17 and 19 being formed integrally with and leading into the internal conduit 14. The capture element 12 is supported on a support rod 20 by a bracket 21 coupled to the tubes 17 and 19.

Referring again to FIGS. 1 and 2, the support rod 20 forms part of a transfer means indicated generally at 22 and having for its purpose the movement of the capture element 12 through a cycle of movement in which the capture element 12 is firstly dipped into the seed container 13 and is then lifted from the seed container 13 with a captured seed, is moved sideways to a release region 23 where the seed is released, and is then returned to the seed container 13 to capture a further seed. The transfer means 22 comprises a main frame 24 fixed on a base 25 and supporting the support rod 20 for rotary motion about a vertical pivot 26 and about a horizontal pivot 27. The support rod 20 is coupled to a cam plate 28 by a further bracket 29, the cam plate 28 forming an extension of the rod 20 on the far side of the pivot axis 27 from the seed capture element 12. As shown in FIG. 1 the cam plate is biassed downwardly by a tension spring 30 coupled between the plate 28 and the base of a U-shaped bracket 31 which supports the horizontal axis pivot 27 and is in turn mounted on the vertical axis pivot 26. The further bracket 29 serves to locate two plastic hoses 32 and 33 which lead from the first and second control ports 16 and 18 respectively.

As shown in FIG. 2, the cam plate 28 is located in a horizontal plane by a vertical rod 34 which extends through a horizontal slot 35 in the cam plate 28. The vertical rod 34 is fixedly mounted on a horizontal disc 36 which is rotatably mounted on the main frame 24 by a vertical axis bearing 37. The vertical rod 34 acts as a manual handle which may be rotated to revolve the disc 36. Such rotation will produce a horizontal oscillatory motion of the cam plate 35 by interaction of the rod 34 with the slot 28. The vertical rod 34 has a horizontally projecting pin 38 arranged to interact with a downwardly projecting lug 39 on the cam plate 28 once in each rotation of the vertical rod 34. The effect of the pin 38 striking the lug 39 is to raise the cam plate 28 against the action of the spring 30 and to dip the capture element 12 downwardly. This downward motion of the capture element 12 is arranged to take place at that part of the cycle when the capture element 12 is positioned over the seed container 13 and is stationary at the maximum amplitude of its horizontal movement.

As shown in FIG. 2, the disc 36 carries on its perimeter a cam profile 40 offset from the pin 38 by about 90°. The cam profile 40 is arranged to interact with a microswitch 41 shown in FIG. 1 by means of a roller lever 42 projecting from the microswitch 41.

Figure 3:
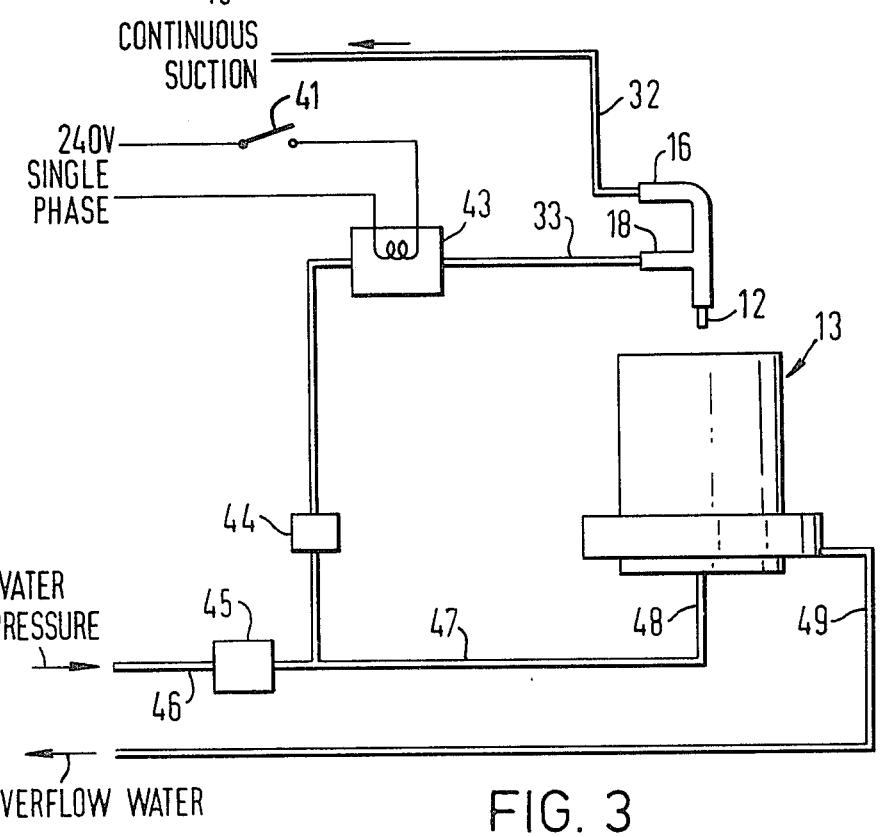
FIG. 3 is a block circuit diagram of the apparatus shown in FIGS. 1 and 2.

FIG. 3 shows a block circuit diagram of the apparatus previously described, and illustrates the various supplies of pressure and suction to the apparatus. The synthetic plastics tubing 32 coupled to the first control port 16 is connected to a source of continuous suction, for example a water jet pump with the tube 32 connected to the suction side of the pump, or a liquid ring pump or equivalent vacuum pump capable of handling water. The synthetic plastics tubing 33 connected to the second control port 18 is connected by way of a solenoid valve 43 and two pressure reducing valves 44 and 45 to the mains water pressure supplied along a pipe 46. The solenoid valve 43 is driven by the microswitch 41 described with reference to FIG. 1, and the valve 43 is arranged to be normally closed. When the microswitch 41 is closed by the cam profile 40 (FIG. 2) the solenoid valve 43 is opened briefly to pass a pulse of positive pressure water to the control port 18 and thence to the internal conduit 14 of the capture element 12.

The mains water from the pipe 46 is also fed to the seed reservoir 13 along a pipe 47 after passing through the first pressure reducing valve 45. The water from the pipe 47 is fed into an inlet 48 of the container 13 (to be described with reference to FIGS. 4 and 5 hereinafter) and overflow water from the container 13 is drained by a pipe 49 to an overflow sink. Alternatively the pressure in the pipe 46 may be provided by a water pump (not shown) and the overflow pipe 49 may be connected back to the input of the water pump so as to recycle water from the container 13 back to the inlet pipe 46. In such a case there will be a small net loss from the water in the container 13 due to the pulses applied by the solenoid valve 43 to the capture element 12. However this loss will be small, and can be overcome by periodic replenishment.

Figure 4:
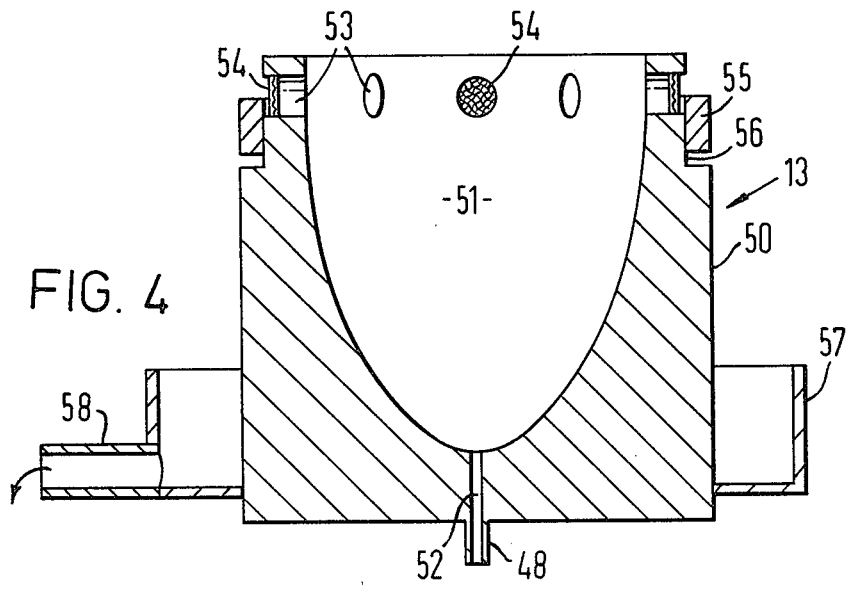
FIG. 4 is a diagrammatic representation in cross-section of a seed container used in the apparatus shown in the preceding figures.
Figure 5:
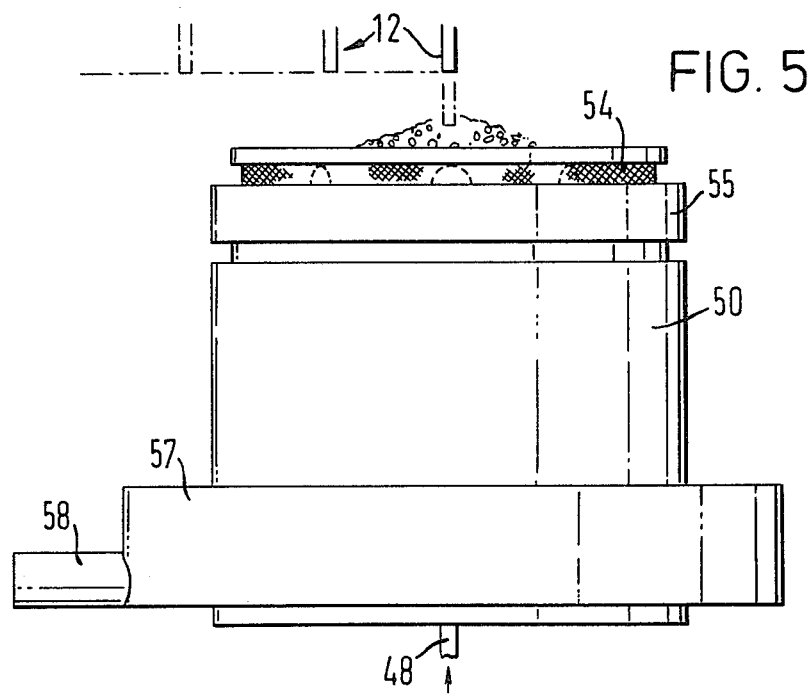
FIG. 5 is a side view of the seed container showing diagrammatically the path of a seed capture element of the apparatus shown in the preceding figures.

Referring to FIGS. 4 and 5 there will now be described in more detail the operation of the seed container 13. The container 13 comprises a main body 50 defining a well 51 having a cross-section generally in the shape of half an ellipse, the major axis of the half ellipse being vertical. At the base of the well 51 there is drilled through the main body 50 an inlet bore 52 for supplying an upwardly directed flow of liquid into the well 51. At the top of the main body 50 eight radial apertures 53 are drilled radiating outwardly from the central axis of the well 51. Each aperture 53 is closed by a gauze 54 which allows outlet of water from the well 51 but retains seeds within the well 51. The main body 50 carries a shallow cylindrical ring 55 which is a sliding fit on a recessed shoulder 56 of the main body 50 and allows an adjustment of the effective overall height of the well 51 to control water overflow. Secured to the base of the main body 50 and surrounding the main body is a cylindrical trough 57 for catching water overflowing over the ring 55, and having a water outlet pipe 58 at one side. Referring briefly to FIG. 3, the inlet bore 52 is coupled by coupling not shown to the inlet tube 48 in FIG. 3, and the outlet tube 58 is coupled again by a coupling not shown, to the outlet tube 49 in FIG. 3.

There will now be described the method of operation of the apparatus shown in the accompanying figures. Referring first to FIGS. 4 and 5, the object of the shaped well 51 and the inlet bore 52 is to present the seeds to the capture element 12 in a manner which assists capture of a seed. The upwardly directed flow of water from the inlet bore 52 produces a continual movement of the seeds down the sides of the well 51 and up the centre axis in a stream or fountain of seeds which rise slightly above the upper surface of the main body 50 as is shown diagrammatically in FIG. 5.

Starting from a position in which the capture element 12 is over the release area 23, rotation of the disc 36 first carries the support arm 20 horizontally through an arc of a circle to bring the capture element 12 over the seed container 13. Contact of the pin 38 with the lug 39 dips the capture element 12 into the centre of the fountain of seeds and water presented by the flow through the inlet bore 52 in the container 13, and a seed is captured on the capture element 12 by means of the continuous suction applied along the synthetic plastics tubing 32. After the pin 38 has passed the lug 39, the capture element 12 rises from the container 13 and is then moved back along the same arc to the release region 23. Upon reaching the release region 23, the cam profile 40 actuates the microswitch 41 which applies a pulse of water to the internal conduit 14 of the capture element 12. The pressure of the pulse applied is arranged to be greater than atmospheric pressure and to be sufficient to overcome the continuous suction applied to the internal conduit 14 from the piping 32, so that momentarily the pressure in the internal conduit 14 in the region of the capture orifice 15 rises above atmospheric pressure and forces the captured seed off the capture orifice 15. After release of the seed, the cycle is repeated.

There will now be given examples of dimensions and materials which may be used in constructing the embodiment described above. However it will be appreciated that these details are given by way of example only and are not limiting upon the principle of operation of the invention. The capture element 12 may have a pick-up head made from fine drawn stainless steel tube with an internal bore of 0.014 inches which has been found to be particularly suitable for lettuce and celery seeds, and will therefore also be suitable for similar sized and shaped seeds. Although the same head may be used for larger seed such as brassicae, changes in internal diameter and/or suction pressure need to be made in particular circumstances to suit particular species of seed.

Conveniently at a metering rate of 2 cycles per second, the combined entry and exit time of the capture element when dipping into the container 13 by the effect of the pin 38 amounts to no more than 30 milliseconds. Thus seed capture is extremely rapid. Conveniently the pressure difference across the capture orifice during the first part of the cycle immediately prior to entry into the container 13 may be 450 millimeters of mercury, and upon capture of a seed the pressure difference may rise to 700 millimeters of mercury. During release of a seed from the capture orifice, the water pressure and timing at the second control port 18 may be arranged to be such that with a 0.014 inch internal diameter of the internal conduit 14, 0.05 milliliters of water is delivered with each seed.

A number of advantages arise from use of the present invention in embodiments including features of the above described construction. The method of presentation of the seed in the container 13 to the pick-up device 12 by means of a water jet directed upwards from the base of the well 51, acting in conjunction with the increasing cross-sectional area of the well 51 in the upward direction, causes the seed to recirculate continuously and to rise in a fountain protruding slightly above the static water level. This ensures that the seed is concentrated in the fountain with a good reliability of seed pick-up. Also because the seed is concentrated in the fountain, seed density in the pick-up zone is consistently high and the seed capture is less sensitive to variations in the total numbers of seed within the container 13 than would be the case with a uniform distribution of seed within the container. Another advantage of the type of container described above is that the container is open to the atmosphere and can thus be readily replenished with seed.

The rapid entry and exit from the fountain of seed in the container 13 arranged by the embodiment described reduces the risk of seed adhering to the outer wall of the capture element 12 by the action of surface tension.

The seed dispensing apparatus described is particularly suitable for dispensing seed into soil blocks for growth of plants initially in sheltered conditions of greenhouses or the like. However it will be appreciated that embodiments of the invention may be modified to allow dispensing of seeds on mobile frames for direct drilling in the field. Furthermore it will be appreciated that the transfer mechanism of the invention is not limited to effecting pivotal movement of the capture element 12 along the arc of a circle, but can easily be modified to produce reciprocal linear motion. Furthermore a bank of capture elements 12 can be mounted on a single transfer mechanism arranged to move the bank of capture elements from a plurality of seed containers 13 to a plurality of seed release areas 23.

The two main advantages of the present invention, at least in the preferred embodiment described above, are speed of operation and increase in reliability in comparison with previously known devices. The increased speed of operation arises because, in accordance with the present invention, there is no need to remove the applied suction and apply a water pulse to release the seed. This is advantageous in comparison both with previously known devices where the applied positive water pulse was applied internally to a capture element to release the seed, and where, more usually, a pulse of water was applied from a separate release means directed to the capture orifice to dislodge the seed. Also, since in accordance with the invention there is no requirement to remove suction from the capture element, the recovery time of the capture suction is quicker than in previously known devices.

The increase in reliability arises from a number of factors. Considering these in terms of seed capture set out in the preferred embodiment, the seed pick-up head or capture element moves rapidly in and out of the seed reservoir, thereby reducing the tendancy for seeds to adhere to the walls of the capture element by surface tension. Typically a seed is captured in 30 milliseconds and at this speed of operation the apparatus can be adapted for use in field drilling as well as soil block seeding. Secondly, the capture element is small in cross-section and thus less likely to displace seeds on entry into the reservoir or to gather seeds on its outer surface by surface tension. Thirdly, the creation of a fountain of seeds in the reservoir means that seed movement is more favourable to seed capture than has been the case in previously known devices. Some form of stirring of the seeds in the liquid is necessary to keep the seeds in suspension, but the stirring effect provided by the preferred embodiment described above is particularly arranged to minimise seed movement at the instant when the seeds are presented for capture by the capture element. Capture of a near stationary seed is more reliable than capture of a rapidly moving, randomly stirred, seed as is found in previously known devices.

As has been discussed previously, embodiments of the present invention may be arranged for capture of, for example, more than one seed at once, for example where a regular predetermined number of seeds are to be delivered at each release location, but the principal advantages of the invention arise where it is desired to capture and release seeds singly, and it is in these arrangements which the advantages set out above are particularly to be found in comparison with prior art devices.

It is to be appreciated that throughout this specification where reference is made to a fluid, the fluid may be a liquid (e.g. water) or a gas (e.g. air). An apparatus or method according to the invention may be arranged so that a fluid constituted by a liquid is used throughout, or so that a fluid consituted by a gas is used throughout, or so that gases and liquids may be used in different components of the apparatus (or in different steps of the method) in one arrangement. For example seeds may be placed in a container in suspension in a liquid, but a captured seed may be released from the capture orifice by application of a pulse of fluid constituted by a gas for example air. Thus in the embodiment described with reference to the drawings, the high pressure pulses applied to the control tube 33 may comprise high pressure pulses of air rather than the water pulses described hereinbefore. As a further modification (which may be used in addition to, or separately from the first modification) the seeds in the container 13 may be maintained in suspension in a gas, for example air, by an upward flow of gas through the passageway 52.

What is claimed is:

1. A method of dispensing seeds from a liquid comprising the steps of placing discrete seeds in suspension in a liquid having a free upper surface, capturing a seed against a capture orifice by means of a pressure difference across the orifice, producing relative movement between the capture orifice and the said seeds in suspension and positioning the capture orifice with the captured seed at a release location for dispensing the seed, and releasing the captured seed from the capture orifice, the first mentioned step including the step of supplying an upwardly directed flow of liquid in the said suspension of the said discrete objects such as to produce recirculatory movement of seeds in which a stream of discrete seeds is carried upwardly towards the surface of the liquid to produce a fountain of seeds rising slightly above the surface of the liquid, the capture orifice being brought to the fountain for capture of a seed.

2. A method according to claim 1 including the step of moving the capture orifice in a downward movement towards the said upward stream of seeds for capture of an object.

3. Apparatus for dispensing seeds from a liquid comprising:
   a container for containing seeds in suspension in a liquid having a free upper surface;
   a capture element having a capture orifice for capturing a seed against the capture orifice from the liquid by means of a pressure difference across the orifice;
   transfer means for moving the capture orifice towards and away from the surface of the liquid in the container and for positioning the capture orifice after capture of a seed at a release region for dispensing of the captured seed;
   control means for applying a pressure difference across the capture orifice to capture the seed and for releasing the captured seed from the capture orifice at the release region;
   flow means for supplying an uninterrupted, localized, upwardly directed flow of liquid within the body of seeds such as to produce a recirculatory movement of seeds in which the stream of seeds is carried upwardly within the body of seeds to form a fountain of seeds rising slightly above the surface of the liquid, the transfer means being arranged to bring the capture orifice to the said fountain of seeds for the capture of a seed from the fountain.

4. Apparatus according to claim 3 including mounting means for mounting said capture element for downward movement towards said upward stream of seeds in the container for capture of a seed by the capturing orifice.

5. Apparatus according to claim 3 in which the said flow means comprises an inlet passageway in the base of the container for directing a flow of liquid under pressure greater than the pressure of the fluid in the container upwardly into the suspension of seeds in the container.

6. Apparatus according to claim 3 in which the cross-section of the interior of the container increases in a vertical direction with distance from the base of the container.

7. Apparatus according to claim 6 in which the vertical cross-section of the container is generally in the form of part of an ellipse, with the major axis of the ellipse vertical.

* * * * *